Jan. 10, 1950  G. WIKKENHAUSER ET AL  2,493,795
FILM PROJECTION WITH CONTINUOUSLY MOVING FILM
Filed Feb. 26, 1947
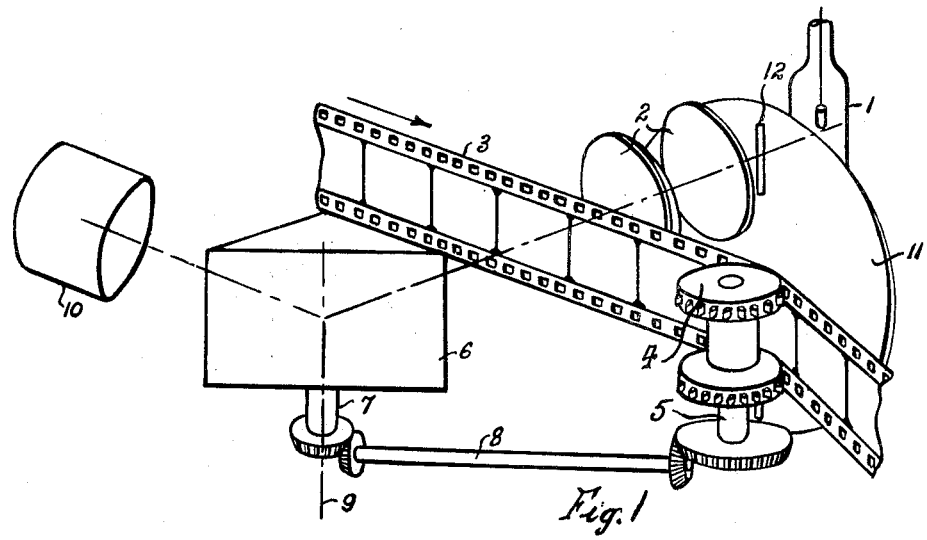
Fig. 1
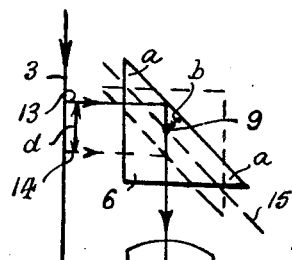
Fig. 2.
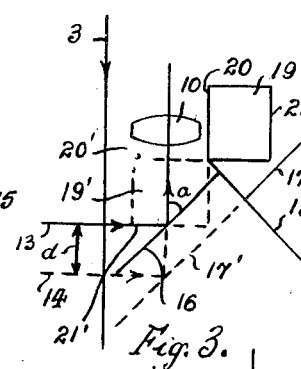
Fig. 3.
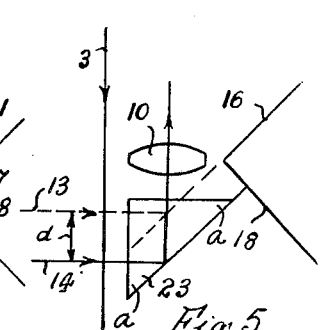
Fig. 5.
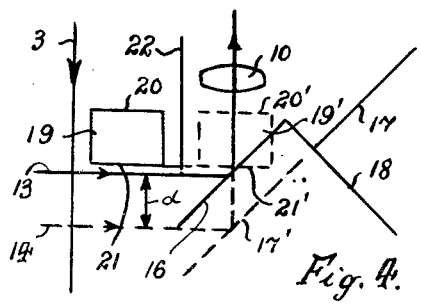
Fig. 4.
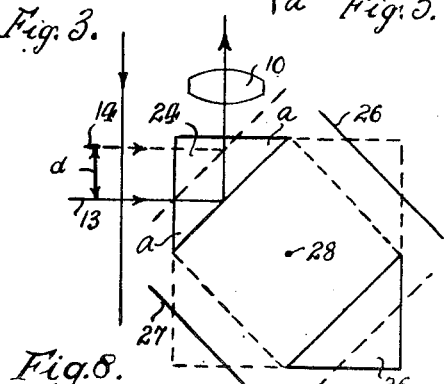
Fig. 8.
Fig. 6.
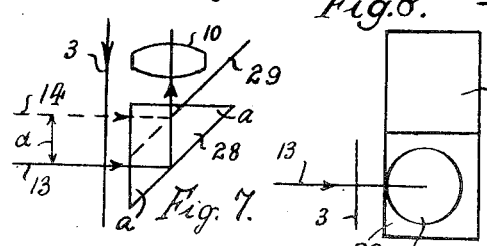
Fig. 7.
INVENTORS:
GUSTAV WIKKENHAUSER,
ALBERT ERNEST ADAMS,
GORDON HENRY COOK, and
RICHARD ERNEST DUGGAN,
BY Cushman, Darby & Cushman
ATTORNEYS Patented Jan. 10, 1950

2,493,795

UNITED STATES PATENT OFFICE 2,493,795

FILM PROJECTION WITH CONTINUOUSLY MOVING FILM

Gustav Wikkenhauser, Albert Ernest Adams, Gordon Henry Cook, and Richard Ernest Duggan, Wells, England Application February 26, 1947, Serial No. 730,904
In Great Britain December 16, 1946

14 Claims. (Cl. 88—16.8)

The present invention relates to film projection with continuously moving film and is concerned with an apparatus of the kind set forth in British Patent No. 589,971.

In the British patent there is set forth a method of projecting a substantially stationary image of a continuously moving film in which the film is illuminated with flashes of light of such short duration that the amount of movement of the film during such flashes is within the definition required. In order to avoid flicker the number of flashes per frame is made greater than one, usually two or three, and the light beam forming the image of each frame is displaced to compensate for the motion of the film that takes place between successive illuminations per frame.

Since the number of flashes per frame is usually small, the optical means needed to effect the compensation are far simpler than those required when the film is continuously illuminated.

In the British patent referred to, various means for effecting the required displacement of the light beam between successive flashes are disclosed, some of these operating by refraction and some by reflection. In each case movement of one or more optical elements is produced. The movements disclosed are of two classes, one translational which involves oscillatory motion, and the other rotary. The rotary movements disclosed are of two kinds, one in which individual optical elements are rotated into and out of the light path about different axes and the other in which the optical elements are caused to rotate into and out of the light path about a single axis but in which the rotation is not simple since the orientation of the elements is kept constant by suitable mechanism.

Again the displacing means set forth in the British patent can be divided into two varieties in one of which the required displacement is obtained by substituting one optical displacing element for another, the length of the light path remaining the same. In the other variety the displacement is effected by the presence or absence of a light deflecting element, the length of the light path being different in the two cases In the case where no light reflecting element is present a glass plate of suitable thickness is inserted in the light path to compensate for the difference in path length.

It is the principal object of the present invention to provide alternative means for effecting the displacement.

Another object of the invention is to enable the necessary displacement of the light beam between successive light flashes to be effected by producing simple rotation of one or more optical elements about a single axis.

According to the principal feature of the present invention, the displacement of the light beam between successive flashes is effected by moving successively into the light path optical elements producing the desired displacements and at the same time a change in the length of the optical path, optical means for substantially correcting for such change in length of path being moved into and out of the light path in step with the movements of the said optical elements.

Certain embodiments of the invention will be described by way of example with reference to the accompanying drawings in which—

Fig. 1 is a diagrammatic perspective view showing one embodiment, Fig. 2 is a diagrammatic representation in side elevation of the optical displacing means of Fig. 1.

Figs. 3 to 7 are diagrammatic representations in side elevation of other displacing means according to the invention and Fig. 8 is a diagrammatic view in plan of the displacing means in Fig. 7

Referring to Fig. 1, a light source 1 is associated with an optical system 2 by which light from the source 1 is caused to illuminate a film 3 which is moved continuously in the direction of the arrow thereon by means of a sprocket 4 on a spindle 5. After passing through the frame of the film which is operative at any instant the light enters displacing means in the form of a right angle prism 6 which is mounted upon a spindle 7 which is geared at 8 in a suitable ratio, to be explained later, to the spindle 5. The axis of rotation of the prism 6 is indicated at 9. Light reflected at the hypotenuse face of the prism passes through a projecting lens system indicated at 10.

The light source 1 is an electric discharge lamp and may be fed with two pulses of current of very short duration, whilst each frame of the film is in the light path. The duration of each pulse is so short, for example of the order of $1/24000$ second or less that the definition of the projected picture is not perceptibly impaired by the movement of the film taking place during a flash.

In addition there may if desired be provided a disc 11 having a slot 12, the disc being rotated in step with the film movement to cause the slot 12 to traverse the light path once during each flash. It can then be arranged that only the brightest part of each flash of the lamp 1 serves to illuminate the film.

If desired the flashes may be produced solely by the action of the disc 11, the light source 1 being continuously operative or fluctuating relatively slowly, although this will not usually be desirable in view of the much lower optical efficiency.

Referring now to Fig. 2 which shows certain parts of Fig. 1 diagrammatically, the prism 6 is rotated about the axis 9 perpendicular to the plane of the paper. When it is in the full line position corresponding to the position shown in Fig. 1 the light follows the full line path 13 from the film 3 to the projection system 10. When the prism has been rotated through 180° to the dotted line position, the light follows the dotted path 14. There is, therefore, a displacement $d$ between the points on the film from which the light rays are superimposed upon the axis of the optical system 10. The hypotenuse surface of the prism 6 is preferably surface silvered.

It is evident that since there are two flashes per frame the prism 6 must be so geared that it rotates once per frame of the film and that is in the full line position for the first flash per frame and in the dotted position for the second flash.

The prism 6 need not be rotated about the axis 9 but about any other axis in a plane containing the lines 9 and 15 for example the axis may be the line 15.

Rotation about the axis 9 is however preferred since if this is counterclockwise in the figure, the displacement error introduced by any angular error in the position of the prism at the instant of a flash is nearly compensated by the movement of the film.

This is because the effect of rotation of the prism is to displace the light beam in the same direction as is needed to compensate for film movement.

In the example given the prism angle $a$ is 45° but it may have other angles. The axis of rotation must be disposed at a distance $b$ from the hypotenuse such that $$b = \frac{d}{4 \cos a}$$

The length of the optical path in the prism should be equal to $$\frac{Nd \tan a}{N-1}$$

where $N$ is the coefficient of refraction of the material of the prism for the wave length of the light for which the system is to be corrected, for example for the D line of the spectrum, as in this case the prism compensates for the increased length of light path along 13 as compared with that along 14.

The arrangement of Figs. 1 and 2 has the disadvantage that movement of the prism 6 about its axis 9 produces some displacement of the light beam even though this is largely compensated as described. Consequently it is necessary that the movement of the prism should be sufficiently precisely related to the movement of the film and the flashing of the lamp to give the desired definition. For some purposes this may not be a serious objection but Fig. 3 shows an arrangement in which this error can be reduced without reliance being placed upon compensation by film movement.

In Fig. 3, the displacing means comprise two plane mirrors 16 and 17 rotatable about an axis 18. Also rotatable with the mirrors is a cylindrical glass block 19 having its flat end faces 20 and 21 polished. The angle $a$ made by the mirrors 16 and 17 with the optical axis of the projecting system 10 need not necessarily be 45° as shown.

In the full line position of the mirrors the light follows the full line path from 13 to the axis of the lens system 10. When the mirrors have been rotated through 180° to bring mirror 17 to the dotted position 17', the light path is the dotted one from 14 to the axis of the lens system 10 and this path traverses the block 19 now in the dotted position 19', entering at the face 21' and emerging at the face 20'. The distance between the planes of the mirrors 16 and 17 is made equal to $$\frac{d}{2 \cos a}$$

The block 19 is of thickness (between faces 20 and 21) equal to $$\frac{Nd \tan a}{N-1}$$

and then compensates for the change of optical path length.

Since the mirrors remain in the same planes, that is to say move parallel to themselves during their rotation, no error in displacement is introduced on account of their movement. The only requirement is that they shall be in their correct planes and in the light path when the appropriate light flash occurs.

Error in displacement is, however, introduced by movement of the block 19 because the faces 20 and 21 do not remain truly perpendicular to the axis of the light beam. This error is only a second order one and for many purposes the arrangement will be found quite satisfactory.

Another arrangement which is rather less simple but which is free from even the second order error is shown in Fig. 4. This differs from Fig. 3 only in that the block 19 is mounted for rotation about an independent axis 22 so that the faces 20 and 21 move in their own planes. The rotations of the mirrors 16, 17 and block 19 are arranged to take place at the same speed and in such phase relation that the block is in the light path when the mirror 17 is operative.

In Figs. 3 and 4, the block 19 may be arranged, when operative, to lie in the light path between the film 3 and the mirror 17 instead of between the mirror 17 and the lens 10 as shown.

In the arrangement of Fig. 4 where rotation of the displacing means introduces no displacement error the mechanism for effecting the rotation can be very simple since accuracy of positioning about the axis 18 is unnecessary. With an arrangement such as that of Fig. 3 with a second order error in displacement the need for accuracy of positioning about the axis 18 in relation to the instants of flashing is more important but still need not be very great for many purposes. With arrangements such as in Figs. 1 and 2, however, considerable accuracy is needed for good results.

Referring now to Fig. 5, this differs from Fig. 3 only in that the mirror 17 is replaced by a reflecting prism 23. As in Fig. 3 a second order displacement error is introduced by the rotation about the axis 18. The distance between the planes of the mirror 16 and the hypotenuse face of the prism 23 is made equal to $$\frac{d}{2 \cos a}$$

and the length of the optical path in the prism 23 is made equal to $$\frac{Nd \tan a}{N-1}$$

Again it is not necessary that $a$ should equal 45°.

In Fig. 6, the displacing means comprises two prisms 24 and 25 and two mirrors 26 and 27 mounted for rotation about an axis 28. The appearance of the prisms and mirrors after rotation through 90° is indicated in dotted lines. It will be seen that when the device is in the full line position the light path is the full line one 13, reflection taking place at the hypotenuse of the prism 24, and when the device is in the dotted line position the light path is the dotted one 14, displaced by $d$ from the path 13, since reflection then takes place from the mirror 26 (say).

In this arrangement owing to the use of two prisms and two mirrors, the displacing means is rotated only through 180° per frame. Moreover it will be seen that the means are of the kind giving a first order error since the prisms and mirrors are moved in such a way as by their movement to displace the light beam in the direction of film travel.

If the film 3 is moved at a speed corresponding to 24 frames per second, clearly the linear speed of the film will depend upon the size of the frames (and also upon their spacing if this varies). The angular speed of the displacing means on the other hand depends only upon the number of frames per second and in the case of 24 frames per second the angular speed must be 12 revolutions per second. The rate of displacement of the light beam is clearly proportional to the angular speed of the displacing means.

Now if it is attempted to compensate for the first order error due to displacement of the light beam by rotation of the displacing means it is evident that a different result is obtained according to whether a device such as that of Fig. 5 is used in which the speed of rotation is 24 revolutions per second or one such as is shown in Fig. 6 rotating at half this speed. If the frames are relatively closely spaced the device of Fig. 6 will give a better approximation to compensation than that of Fig. 5 and vice versa. Consequently, when displacing means introducing first order errors are used, the number of optical elements used and the specification of rotation may therefore, be chosen to give the best compensation.

In Figs. 7 and 8 the displacing means comprise a prism 28 and a mirror 29 which are displaced in a direction perpendicular to the plane of the paper in Fig. 7 to bring the prism and mirror alternately into the lightpath. The prism is designed as already described to correct for the change in optical path length. Since not only the reflecting surfaces but also the surfaces of the reflecting body move in their own planes no error is introduced by the movement and it is only necessary that the mechanism effecting the movement should be made accurately enough for the appropriate elements 28 and 29 to be operative during the alternate flashes.

The prisms 6 of Figs. 1 and 2, 23 of Fig. 5, 24 and 25 of Fig. 6 and 28 of Fig. 7 need not necessarily be right angled, in which case the term "reflecting surface" should be substituted for "hypotenuse."

We claim:

1. Apparatus for projecting spatially stationary pictures from continuously moving film comprising means for strongly illuminating each picture frame of said film in succession during two very brief periods during each frame, said periods being so brief that no compensation for the movement of the film which occurs during such periods is required, means for projecting the picture frames on to a screen by the light by which they are so illuminated, and means for compensating for the movement of the film in the time interval between two successive illuminations of one and the same picture frame, said compensating means comprising an optical system including a first and a second light reflecting surface and a light refracting body and having two operative positions, in the first of which said first reflecting surface is in the path of the projecting light and in the second of which said second reflecting surface and said refracting body are in the said path, the distance traversed by light from said film to the emergent side of said optical system is greater than in said first position and the said path is displaced relatively to that in said first position, and means for locating said optical system in said first position during one of said brief periods of illumination and in said second position during the next succeeding brief period of illumination.

2. Apparatus for projecting spatially stationary pictures from continuously moving film comprising means for strongly illuminating each picture frame of said film in succession during a small plurality of periods which are so brief that no compensation for the movement of the film which occurs during such periods is required, means for projecting the picture frames on to a screen by the light by which they are so illuminated, and means for compensating for the movement of the film in the time interval between two successive illuminations of one and the same picture frame, said compensating means comprising a plurality of light deflecting elements each defining a different path for said light, means to support said elements for rotation about an axis while maintaining all points on each said element at a fixed distance from said axis, and means to rotate said elements about said axis to bring said elements successively into said path before successive ones of said periods and out of said paths after such periods respectively.

3. Apparatus for projecting spatially stationary pictures from continuously moving film comprising means for strongly illuminating each picture frame of said film in succession during a small plurality of periods which are so brief that no compensation for the movement of the film which occurs during such periods is required, means for projecting the picture frames on to a screen by the light by which they are so illuminated, and means for compensating for the movement of the film in the time interval between two successive illuminations of one and the same picture frame, said compensating means comprising a body having a plurality of light reflecting surfaces each defining a different projection light path and means for producing simple rotation of said body about an axis to bring a different one of said surfaces into the path of the projecting light during successive brief periods of illumination.

4. Apparatus for projecting spatially stationary pictures from continuously moving film comprising means for strongly illuminating each picture frame of said film in succession during a small plurality of periods so brief that no compensation for the movement of the film which occurs during such periods is required, means for projecting the picture frames on to a screen by the light by which they are so illuminated, and means for compensating for the movement of the film in the time interval between two successive illuminations of one and the same picture frame, said compensating means comprising an optical system including at least two light reflecting surfaces and at least one light refracting body and having at least two operative positions in the first of which one of said light reflecting surfaces is in the path of the projecting light and in the second of which another of said light reflecting surfaces and a light refracting body are in the said path, and means for locating said optical system in said first position during one of said brief periods of illuminating and in said second position during the next succeeding brief period of illumination.

5. Apparatus for projecting spatially stationary pictures from continuously moving film comprising means for strongly illuminating each picture frame of said film in succession during a small plurality of periods which are so brief that no compensation for the movement of the film which occurs during such periods is required, means for projecting the picture frames on to a screen by the light by which they are so illuminated, and means for compensating for the movement of the film in the time interval between two successive illuminations of one and the same picture frame, said compensating means comprising an optical system including at least two light reflecting surfaces and at least one light refracting body and having at least two operative positions in the first of which one of said light reflecting surfaces is in the path of the projecting light and in the second of which another of said light reflecting surfaces and a light refracting body are in the said path, and means for producing simple rotation of said optical system about an axis to locate said optical system in said first position during one of said brief periods of illumination and in said second position during the next succeeding brief period of illumination.

6. Apparatus for projecting spatially stationary pictures from continuously moving film comprising means for strongly illuminating each picture frame of said film in succession during a small plurality of periods which are so brief that no compensation for the movement of the film which occurs during such periods is required, means for projecting the picture frames on to a screen by the light by which they are so illuminated, and means for compensating for the movement of the film in the time interval between two successive illuminations of one and the same picture frame, said compensating means comprising an optical system including two plane reflecting surfaces and a refracting body mounted for rotation about an axis, and means for rotating said system about said axis to bring one of said reflecting surfaces into the path of the projecting light during one of said brief periods of illumination and the other of said reflecting surfaces and said refracting body into the said path during the next succeeding brief period of illumination.

7. Apparatus for projecting spatially stationary pictures from continuously moving film comprising means for strongly illuminating each picture frame of said film in succession during a small plurality of periods which are so brief that no compensation for the movement of the film which occurs during such periods is required, means for projecting the picture frames on to a screen by the light by which they are so illuminated, and means for compensating for the movement of the film in the time interval between two successive illuminations of one and the same picture frame, said compensating means comprising an optical system including a plane mirror having a light reflecting surface and a prism of light refracting material having an internal light reflecting surface, said optical system being mounted for rotation about an axis, and means for rotating said system about said axis to bring one of said reflecting surfaces into the path of the projecting light during one of said brief periods of illumination and the other of said reflecting surfaces into the said path during the next succeeding brief period of illumination.

8. Apparatus according to claim 7, wherein said axis is substantially parallel to said reflecting surfaces.

9. Apparatus for projecting spatially stationary pictures from continuously moving film comprising means for strongly illuminating each picture frame of said film in succession during a small plurality of periods which are so brief that no compensation for the movement of the film which occurs during such periods is required, means for projecting the picture frames on to a screen by the light by which they are so illuminated, and means for compensating for the movement of the film in the time interval between two successive illuminations of one and the same picture frame, said compensating means comprising an optical system including two plane reflecting surfaces and a refracting body mounted for rotation about an axis substantially perpendicular to the planes of said reflecting surfaces, and means for rotating said system about said axis to bring one of said reflecting surfaces into the path of the projecting light during one of said brief periods of illumination and the other of said reflecting surfaces and said refracting body into the said path during the next succeeding brief period of illumination.

10. Apparatus for projecting spatially stationary pictures from continuously moving film comprising means for strongly illuminating each picture frame of said film in succession during a small plurality of periods which are so brief that no compensation for the movement of the film which occurs during such periods is required, means for projecting the picture frames on to a screen by the light by which they are so illuminated, and means for compensating for the movement of the film in the time interval between two successive illuminations of one and the same picture frame, said compensating means comprising an optical system including two plane reflecting surfaces arranged in different but substantially parallel planes and a refracting body, said system being mounted for rotation about an axis, and means for rotating said system about said axis to bring one of said reflecting surfaces into the path of the projecting light during one of said brief periods of illumination and the other of said reflecting surfaces and said refracting body into the said path during the next succeeding brief period of illumination.

11. Apparatus for projecting spatially stationary pictures from continuously moving film comprising means for strongly illuminating each picture frame of said film in succession during a small plurality of periods so brief that no compensation for the movement of the film which occurs during such periods is required, means for projecting the picture frames on to a screen by the light by which they are so illuminated, and means for compensating for the movement of the film in the time interval between two successive illuminations of one and the same picture frame, said compensating means comprising an optical system including a plane mirror having a light reflecting surface and a prism of light refracting material having an internal light reflecting surface located in a plane different from but parallel to the plane of the first named reflecting surface, and means for oscillating said optical system in directions substantially parallel to said planes to bring one of said reflecting surfaces into the path of the projecting light during one of said brief periods of illumination and the other of said reflecting surfaces into the said path during the next succeeding brief period of illumination.

12. Apparatus for projecting spatially stationary pictures from continuously moving film comprising means for strongly illuminating each picture frame of said film in succession during a small plurality of periods which are so brief that no compensation for the movement of the film which occurs during such periods is required, means for projecting the picture frames on to a screen by the light by which they are so illuminated, and means for compensating for the movement of the film in the time interval between two successive illuminations of one and the same picture frame, said compensating means comprising an optical system including a plurality of plane mirrors each having a light reflecting surface and a plurality of prisms of light refracting material each having an internal light reflecting surface, said optical system being mounted for rotation about an axis substantially parallel to said reflecting surfaces and each of said mirrors being disposed between two of said prisms around said axis, and means for rotating said system about said axis to bring one of said mirror surfaces into the path of the projecting light during one of said brief periods of illumination and an adjacent one of said prisms into the said path during another of said brief periods in each frame period.

13. Apparatus according to claim 12, wherein said small plurality is two.

14. Apparatus for projecting spatially stationary pictures from continuously moving film comprising means for strongly illuminating each picture frame of said film in succession during a small plurality of periods which are so brief that no compensation for the movement of the film which occurs during such periods is required, means for projecting the picture frames on to a screen by the light by which they are so illuminated, and means for compensating for the movement of the film in the time interval between two successive illuminations of one and the same picture frame, said compensating means comprising an optical system including two plane reflecting surfaces and a refracting body, said reflecting surfaces being located in different but parallel planes, and means for oscillating said optical system in directions substantially parallel to the planes of said surfaces to bring one of said reflecting surfaces into the path of the projecting light during one of said brief periods of illumination and the other of said surfaces and said refracting body into the said path during the next succeeding brief period of illumination.

GUSTAV WIKKENHAUSER.
ALBERT ERNEST ADAMS.
GORDON HENRY COOK.
RICHARD ERNEST DUGGAN.

REFERENCES CITED

The following references are of record in the file of this patent:

UNITED STATES PATENTS

| Number | Name | Date |
| --- | --- | --- |
| 1,485,195 | Messter | Feb. 26, 1924 |
| 2,113,194 | Dorgelo | Apr. 5, 1938 |
| 2,186,013 | Edgerton | Jan. 9, 1940 |
| 2,257,938 | Clothier | Oct. 7, 1941 |

FOREIGN PATENTS

| Number | Country | Date |
| --- | --- | --- |
| 385,194 | Germany | Dec. 6, 1923 |
| 472,013 | Great Britain | Sept. 15, 1937 |